Jan. 16, 1968     D. F. McFARLAND     3,363,913
OSCILLATING WHEEL SUPPORT FOR VEHICLES
Filed Oct. 21, 1965     3 Sheets-Sheet 1
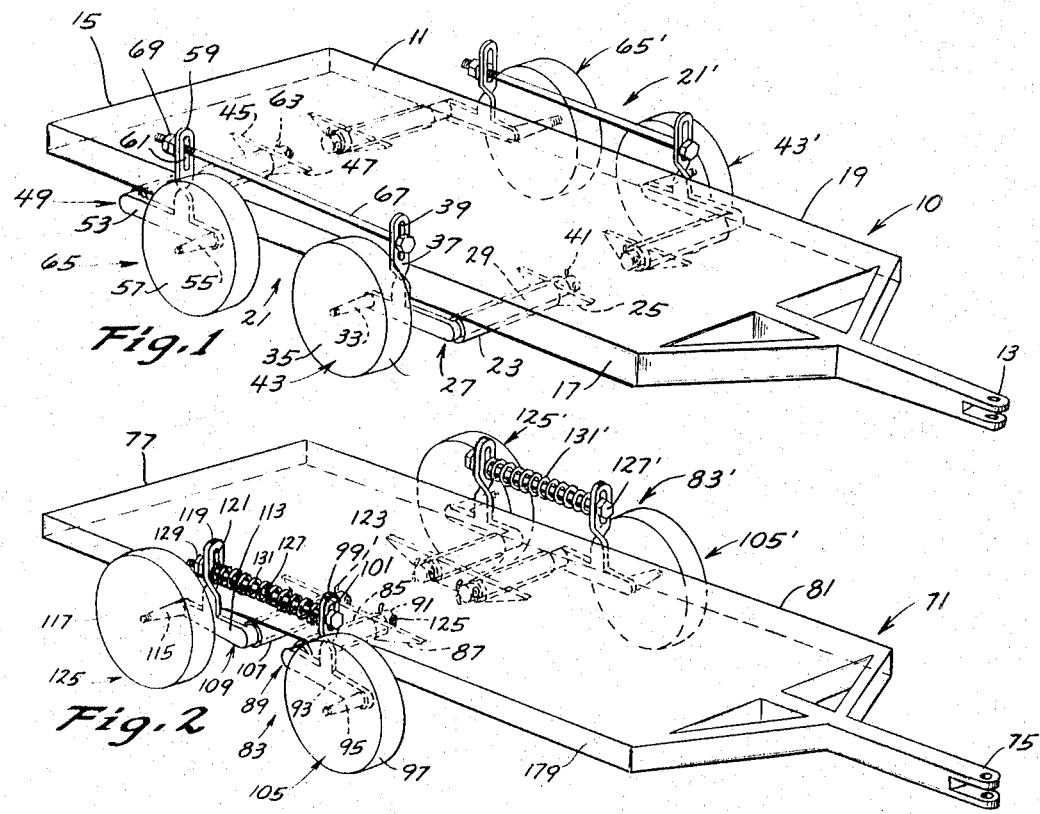
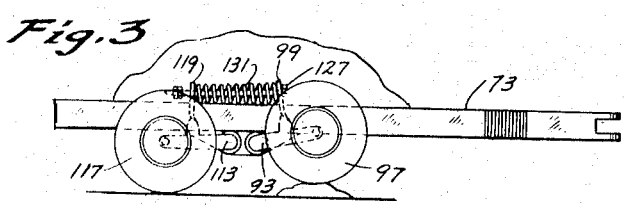
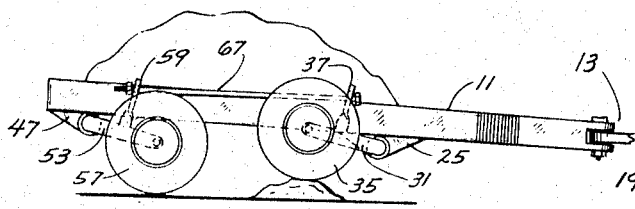
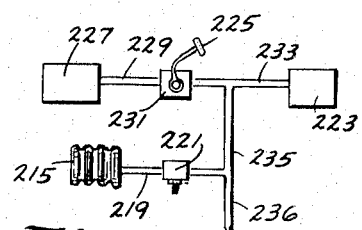
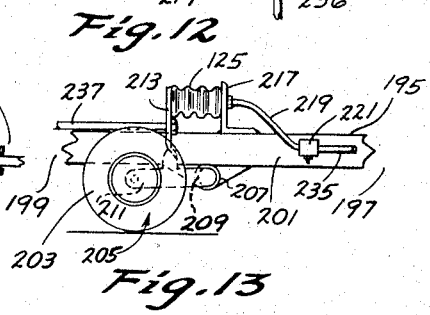
INVENTOR
DOUGLAS F. McFARLAND
BY Zarley, McKee & Thomte
ATTORNEYS Jan. 16, 1968  D. F. McFARLAND  3,363,913
OSCILLATING WHEEL SUPPORT FOR VEHICLES
Filed Oct. 21, 1965  3 Sheets-Sheet 2

INVENTOR
DOUGLAS F. McFARLAND
BY
ATTORNEYS

Jan. 16, 1968     D. F. McFARLAND     3,363,913
OSCILLATING WHEEL SUPPORT FOR VEHICLES
Filed Oct. 21, 1965     3 Sheets-Sheet 3

INVENTOR
DOUGLAS F. McFARLAND
BY
ATTORNEYS

United States Patent Office 3,363,913
Patented Jan. 16, 1968

3,363,913
OSCILLATING WHEEL SUPPORT FOR VEHICLES
Douglas F. McFarland, Davis City, Iowa 50065
Filed Oct. 21, 1965, Ser. No. 500,132
2 Claims. (Cl. 280—104.5)

ABSTRACT OF THE DISCLOSURE

A vehicle having an oscillating wheel support and including a frame with lateral sides with a pair of wheels independently rotatably and pivotally secured to each side of the frame. The pair of wheels at each side are interconnected to coordinate their pivotal movement.

---

All vehicles, from farm trailers to over-the-road trucks, which are adapted to carry a variety of loads, experience a universal problem relating to the roads and the terrain over which the vehicles travel. Many of these vehicles in use today do not have an adequate spring suspension system that will permit the vehicle to maintain a reasonably level attitude when one of the supporting wheels encounters an obstruction or a depression. The result is that the vehicle frame and the supporting load are tilted to an undesirable angular position whenever such problems are encountered. This results in a shifting of the load in many instances which can cause additional problems even after the vehicle frame has subsequently passed the obstruction.

In addition, many of the vehicles in common use today do not have the ability to uniformly distribute the load on the vehicle frame to the plurality of vehicle supporting wheels. Moreover, these vehicles do not have the ability to permit the wheels to absorb a change in the loading conditions when one of the wheel supporting elements encounters an obstruction or a depression in the terrain over which the vehicle is traveling. Many such vehicles provide no coordination between a plurality of wheel supporting elements, and those oscillating wheel structures which do exist are limited in their ability to compensate for the problems outlined above, and their respective designs impose substantial stress on the structure whereby the wheels are connected to the vehicle frame.

Therefore, a principal object of this invention is to provide a coordinated oscillating wheel mounting means for vehicles which will tend to maintain the vehicle frame in a substantially level condition whenever one of the supporting wheels encounters an obstruction or depression in the terrain over which the vehicle is traveling.

A further object of this invention is to provide a coordinated oscillating wheel mount for vehicles which will serve to equalize the load on the various supporting wheels whenever one of the supporting wheels encounters an obstruction or depression in the terrain over which the vehicle is traveling.

A still further object of this invention is to provide a coordinated oscillating wheel mount for vehicles which can serve to level the vehicle frame when it is loaded under unbalanced conditions.

A still further object of this invention is to provide a coordinated oscillating wheel mount for vehicles which is particularly strong and which is sensitive to unbalanced conditions on the vehicle frame.

A still further object of this invention is to provide a coordinated oscillating wheel mount for vehicles which will automatically resist a tendency of the vehicle frame to assume a non-level position when the brakes are imposed upon the wheels of the vehicle.

A still further object of this invention is to provide an oscillating wheel support for vehicles which will prevent forward tilting of the vehicle frame when the vehicle brakes are applied.

A still further object of this invention is to provide a coordinated oscillating wheel mount for vehicles which is economical of manufacture, durable in use, and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIGURE 1 is a perspective view of a farm wagon upon which the wheel structure of this invention is mounted;

FIGURE 2 is a perspective view of a farm wagon upon which an alternate form of wheel structure is mounted;

FIGURE 3 is a side elevational view of the device of FIGURE 2;

FIGURE 4 is a side elevational view of the device of FIGURE 1;

FIGURE 12 is a schematic diagram showing the air circuitry of an alternate form of the invention; and FIGURE 13 is a partial side elevational view of an alternate form of the invention utilizing the structure shown in FIGURE 12.

Figure 5:
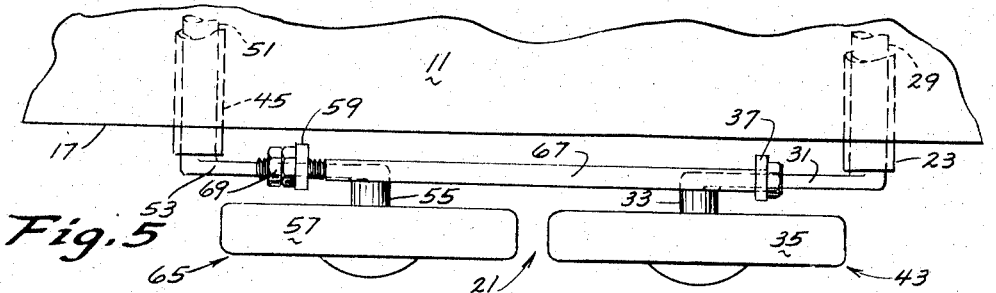
FIGURE 5 is a top plan view of the wheel structure at one side of the device of FIGURE 1, and shown at an enlarged scale.

With respect to the embodiment of FIGURES 1, 4-6, the numeral 10 generally designates a trailer including a frame 11 having a forward end 13, rearward end 15, and lateral sides 17 and 19. The numeral 21 generally designates a wheel assembly at side 17 of trailer 10 while the numeral 17' designates a wheel assembly at side 19 of trailer 10. Inasmuch as wheel assemblies 21 and 21' are identical, only wheel assembly 21 will be described with "'" indicating identical structure on wheel assembly 21'.

Figure 6:
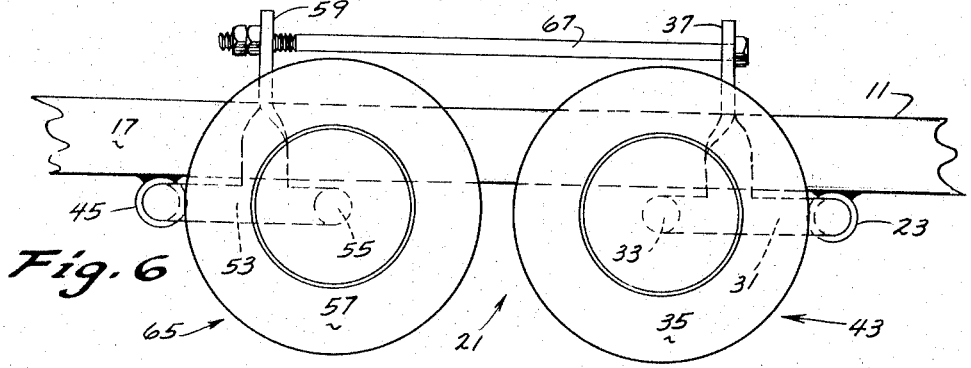
FIGURE 6 is an elevational view of the structure shown in FIGURE 5.
Figure 7:
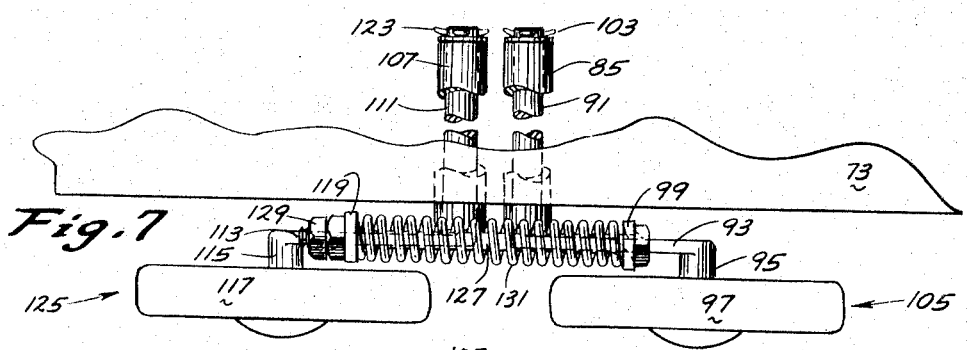
FIGURE 7 is a plan view of the wheel structure at one side of the device shown in FIGURE 2 at an enlarged scale.
Figure 8:
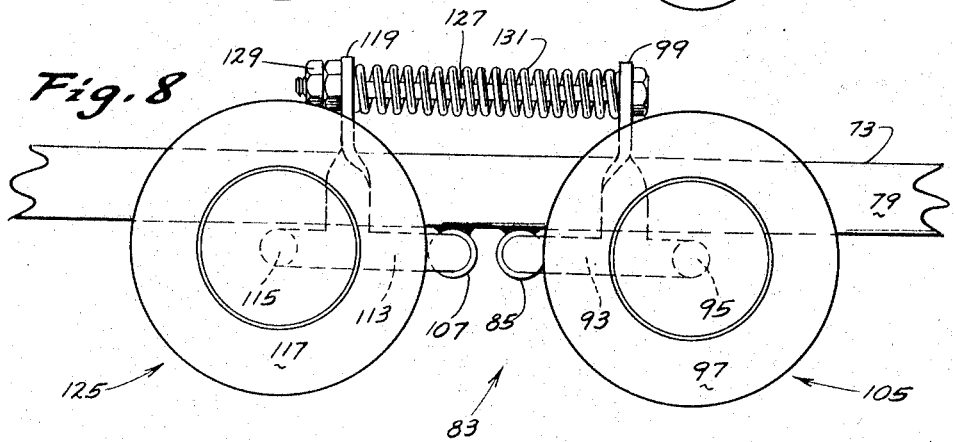
FIGURE 8 is an elevational view of the structure shown in FIGURE 7.

As best seen in FIGS. 1, 5 and 6, a hollow cylinder 23 is secured to the underside of frame 11 by welding or the like and extends transversely to the longitudinal axis thereof. A reinforcing plate 25 is also secured to the underside of frame 11 by welding or the like and is also welded to the inner end of cylinder 23. A spindle means 27 is rotatably mounted in cylinder 23 and includes a cylindrical axle member 29 rotatably mounted in cylinder 23; an arm member 31 extending transversely from the outer end of axle 29 and rearwardly therefrom; and a spindle member 33 extending transversely from the rearward end of arm member 31. A wheel 35 is operatively rotatably mounted on spindle member 33. A bracket 37 is secured to arm member 31 intermediate the length thereof and has a vertical slot 39 formed in the upper end thereof. A pin member 41 extends through the inner end of axle member 29 to maintain axle member 29 in cylinder 23. Elements 23–41 comprise a forward wheel means 43.

An elongated hollow cylinder 45 is secured to the under side of frame 11 rearwardly of forward wheel means 43 by welding or the like and is parallel to cylinder 23. A reinforcing plate 47 is welded to the under side of frame 11 and is also welded to the inner end of cylinder 45. A spindle means 49 is rotatably mounted in cylinder 45 and includes a cylindrical axle member 51 which is rotatably embraced by cylinder 45; an arm member 53 extending transversely from the outer end of axle member 45 and forwardly therefrom; and spindle member 55 extending transversely outwardly from the forward end of arm member 53. A wheel 57 is operatively rotatably mounted on spindle member 55. A bracket 59 is secured to arm member 53 intermediate the length thereof by welding or the like and extends upwardly therefrom and has a vertical slot 61 formed in the upper end thereof. A pin member 63 is extended through the inner end of axle member 61 to maintain axle member 51 within cylinder 45. Elements 45–63 comprise a rearward wheel means 65. An elongated rod 67 is received by slots 39 and 61 in brackets 37 and 59 respectively and extends therebetween. Lock nuts 69 are threadably mounted on the rearward end of rod 67 as best seen in FIGS. 1, 5 and 6.

With respect to the embodiments of FIGS. 2, 3, 7 and 8, the numeral 71 generally designates a trailer including a frame 73 having a forward end 75, rearward end 77, and lateral sides 79 and 81. The numeral 83 generally designates a wheel assembly at side 79 while the numeral 83' designates a wheel assembly at side 81 of trailer 71. Inasmuch as wheel assemblies 83 and 83' are identical, only wheel assembly 83 will be described with " ' " indicating identical structure on wheel assembly 83'.

An elongated hollow cylinder 85 is secured to the under side of frame 11 by welding or the like and extends transversely to the longitudinal axis of frame 11 as seen in the drawings. A reinforcing plate 87 is secured to the under side of frame 11 by welding or the like and is also secured to the inner end of cylinder 85 by welding or the like. A spindle means 89 is operatively pivotally mounted in cylinder 85 and includes an elongated cylindrical axle member 91 which is received by cylinder 85; an elongated arm member 93 extending transversely forwardly from the outer end of axle member 91; and spindle member 95 extending transversely outwardly from the forward end of arm member 93. A wheel 97 is operatively rotatably mounted on spindle member 95. A bracket 99 is secured to arm member 93 intermediate the length thereof and extends upwardly therefrom and has a vertical slot 101 formed in its upper end. Axle member 91 is maintained in cylinder 85 by means of a pin 103 extending through the inner end thereof. Elements 85–103 comprise a forward wheel means.

An elongated hollow cylinder 107 is secured to the under side of frame 11 rearwardly of cylinder 85 by welding or the like. The inner end of cylinder 107 is also welded to reinforcing plate 87. A spindle means 109 is operatively pivotally mounted in cylinder 107 and includes an elongated cylindrical axle member 111 which is pivotally received by cylinder 107; an elongated arm member 113 extending transversely rearwardly from the outer end of axle member 111; and spindle member 115 extending transversely outwardly from the rearward end of arm member 113. A wheel 117 is operatively rotatably mounted on spindle member 115. A bracket 119 is secured to arm member 113 intermediate the length thereof and extends upwardly therefrom and is provided with a vertical slot 121 formed in the upper end thereof. A pin 123 extends through the inner end of axle member 111 to maintain axle member 111 in cylinder 107. Elements 107–123 comprise a rearward wheel means 125. An elongated rod 127 extends through slots 101 and 121 in brackets 99 and 119 respectively and extends therebetween as seen in the drawings. Lock nuts 129 are threadably mounted on the rearward end of rod 127. A spring means 131 embraces rod 127 between brackets 99 and 119.

Figure 9:
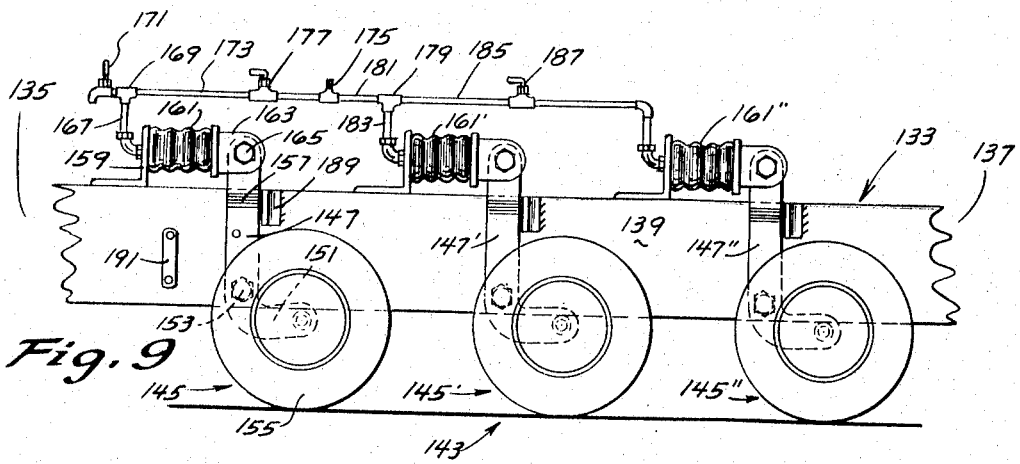
FIGURE 9 is a side elevational view of an alternate form of this invention.
Figure 10:
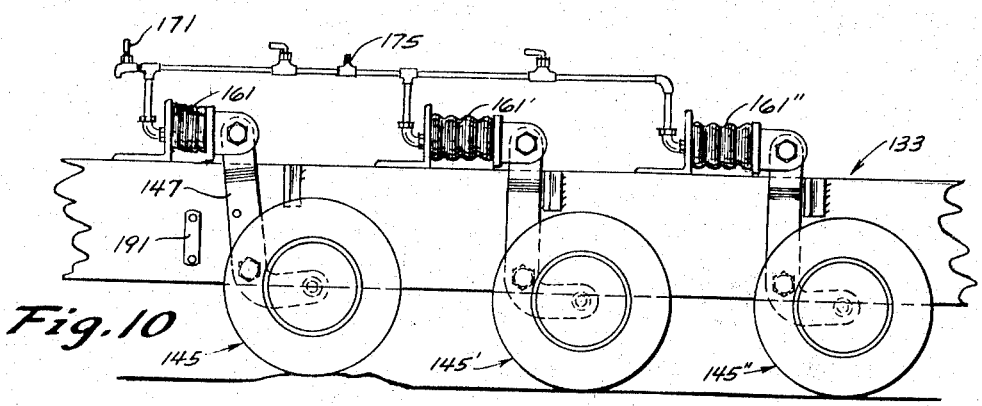
FIGURE 10 is a view similar to that of FIGURE 9, but shows the forward encountering a slight obstruction in the terrain over which the vehicle is traveling.
Figure 11:
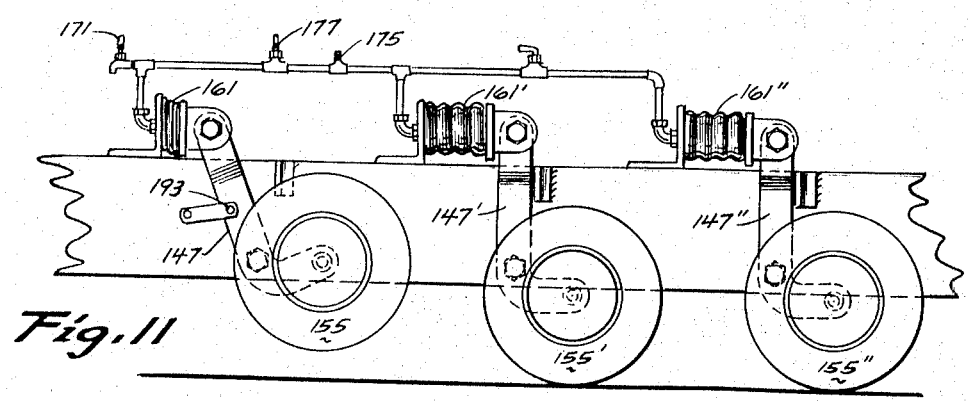
FIGURE 11 is an elevational view of the devices shown in FIGURES 9 and 10 with one of the wheel elements being moved to an inoperative position.

With respect to the embodiment of FIGS. 9–11, the numeral 133 generally designates a vehicle frame having a forward end 135, a rearward end 137 and lateral sides 139 and 141 (not shown). The numeral 143 generally designates a wheel assembly at side 139 which includes wheel means 145, 145' and 145". Inasmuch as wheel means 145, 145' and 145" are identical, only wheel means 145 will be described with " ' " and " '' " indicating identical structure on wheel means 145' and 145" respectively.

An L-shaped support member 147 including arm members 149 and 151 is pivotally secured to side 139 of frame 133 at 153. A wheel 155 is operatively rotatably mounted on arm member 151 at the rearward end thereof. It should be noted that the length of arm member 149 is greater than the length of arm member 151 and that arm member 149 is bent inwardly at 157 so that its upper end is positioned over the top of frame 133. A bracket 159 is secured to frame 133 by any convenient means forwardly of the upper end of arm member 149 and has an air bag 161 operatively secured thereto. The rearward end of air bag 161 is operatively secured to a bracket 163, the rearward end of which is pivotally secured to the upper end of arm member 149 by means of pin 165. A conduit 167 is secured to bracket 159 as seen in the drawings and extends therethrough and is in communication with the interior or air bag 167. Conduit 167 is connected to a T connection 169, in one end of which is mounted a "lead-off-valve" 171. The other end of connection 169 receives a conduit 173 which extends to an air intake connection 175. A valve 177 is imposed in conduit 173 as seen in the drawings. Air is supplied to the system from a source of air pressure by means of air intake connection 175. Air intake connection 175 is operatively connected to a T connection 179 by means of conduit 181. A conduit 183 extends from connection 179 to air bag 161'. A conduit 185 extends from connection 179 to air bag 161" and has a valve 187 imposed therein. The numeral 189 designates a stop means secured to side 139 of frame means 133 by welding or the like which limits the rearward pivotal movement of arm member 149 with respect to frame 133. A toggle 191 is pivotally connected at one of its ends to side 139 forwardly of arm member 149 and is adapted to be secured at its other end to arm member 149 by means of pin 193 to maintain wheel 155 in the position seen in FIG. 11 at times.

Wheel assemblies identical to 145, 145' and 145" are operatively mounted at side 141 of frame 133 and are independently connected to a source of air pressure. In other words, air may be supplied to the wheel assemblies at side 139 without supplying air to the wheel assemblies at side 141 or vice versa.

FIG. 13 illustrates an air bag arrangement which is adapted to be operatively secured to either of the three embodiments previously described. The numeral 195 generally designates a frame means having a forward end 197, a rearward end 199 and lateral sides 201 and 203 (not shown). A wheel assembly 205 is operatively mounted at side 201 of frame 195 and is substantially identical to wheel assembly 43 seen in FIG. 1. An elongated hollow cylinder 207 is secured to the under side of frame 195 by means of welding or the like and pivotally receives a cylindrical axle member 209 therein. An elongated arm member 211 is secured to the outer end of axle member 209 and extends transversely rearwardly therefrom. A wheel 203 is operatively rotatably mounted on the rearward end of arm member 211. A bracket 213 extends upwardly from arm member 211 and has an air bag 215 operatively secured thereto which extends forwardly therefrom. The forward end of air bracket 215 is secured to a bracket 217 which is secured to frame 195 by welding or the like. A conduit 219 extends from bracket 217 and is in communication with the interior of air bag 217. Conduit 219 is operatively connected to a pressure actuated valve 221. With respect to the schematic drawing of FIG. 12, the numeral 223 designates the conventional vehicle brakes; the numeral 225 designates the brake pedal, and the numeral 227 designates an air compressor or the like. A conduit 229 extends between compressor 227 and valve 231 which is controlled by the operation of foot pedal 225. A conduit 233 extends between valve 231 and brakes 223. A conduit 235 extends from conduit 233 to valve 221.

With respect to FIG. 13, the numeral 237 designates a rod member which extends through bracket 213 and extends to a bracket (not shown) operatively connected to a rearward wheel means substantially identical to wheel means 65 shown in FIG. 1.

The method of operation of the embodiment of FIGS. 1, 4-6 is as follows. As seen in FIG. 4, upon striking an obstruction, wheel 35 pivots upwardly about axle member 29 which causes bracket 37 to be pivoted forwardly with respect to frame 11. The forward pivotal movement of bracket 37 causes rod 67 to be moved forwardly which in turn causes bracket 59 to be pivoted forwardly. The forward pivotal movement of bracket 59 causes arm member 53 and wheel 57 with respect to frame 11 which in effect causes frame 11 to be moved upwardly with respect to the road surface. Such co-ordinated pivotal movement of the forward wheel means 43 and rearward wheel means 65 causes the weight of the frame and the load carried thereon to be distributed more evenly between the two ground engaging wheels. In other words, the weight is carried substantially evenly between wheels 35 and 57 when wheel 35 engages the obstruction as seen in FIG. 4. The same is true when the rear wheel passes over the obstruction. As wheel 57 engages the obstruction, arm member 53 will be pivoted upwardly with respect to frame 11 so that bracket 59 is pivoted rearwardly which causes rod member 67 to be also moved rearwardly with respect to frame 11. The rearward movement of rod 67 causes bracket 37 to be moved rearwardly thereby causing arm member 31 to be pivoted downwardly with respect to frame 11. The downward movement of arm member 31 with respect to frame 11 causes frame 11 to be raised with respect to the road surface. In conventional trailers or vehicles, upon the forward wheel engaging obstruction, the rear wheel would be raised from the ground thereby placing all of the weight on the forward wheel. When the rear wheel engaged the obstruction, the forward wheel would be raised from the ground thereby placing all of the weight on the rear wheel.

When the forward wheel 35 drops into a hole or depression in the road surface, bracket 37 will be pivotally moved rearwardly with respect to frame 11. As bracket 37 pivots rearwardly, bracket 59 will also be pivoted rearwardly due to the slight transfer of weight to the rear wheel 57. The rearward pivotal movement of bracket 59 causes rod 67 to exert rearward pressure on bracket 37 which causes downward pressure to be transmitted to the front wheel 35 thereby distributing the weight evenly between the front and rear wheels. When rear wheel 57 drops into the hole or depression in the road surface, the slight transfer of weight to the front wheel will cause bracket 37 to be pivoted forwardly with respect to frame 11 which causes rod 67 to exert forward pressure on bracket 59 which in turn results in a downward pressure being exerted on wheel 57 to distribute the weight between the front and rear wheels. Conventional trailers or vehicles would cause all of the weight to be transferred to the back wheel when the front wheels drops into the depression or hole. Thus it can be seen that the embodiment of FIGS. 1, 4-6 causes the weight of the frame or vehicle and the load carried thereon to be evenly distributed over the four wheels thereon at all times. The even distribution over the four wheels permits the trailer or vehicle to be used to carry heavier loads and permits the usage of lighter springs if springs are used on the trailer or vehicle.

With respect to the embodiment of FIGS. 2, 3, 7 and 8, the method of operation is as follows. When wheel 105 strikes an obstruction, bracket 99 will be pivotally moved rearwardly due to arm member 93 being moved upwardly. The rearward movement of bracket 99 causes spring 131 to exert rearward pressure on bracket 119 which causes bracket 119 to be pivotally moved rearwardly with respect to frame 71. The rearward movement of bracket 119 with respect to frame 71 exerts a downward force on arm member 113 thereby causing frame 71 to be raised and also causing the weight of the frame and the load carried thereon to be transferred to wheel 117. Therefore, when wheel 97 is engaging the obstruction, the weight of the frame and the load carried thereon will be substantially evenly distributed between wheels 97 and 117. When wheel 117 passes over the obstruction, bracket 119 will be pivotally moved forwardly thereby causing spring 131 to pivotally move bracket 99 forwardly and arm member 93 and wheel 97 downwardly with respect to frame 71 or in other words causing side 79 of frame 71 to be slightly moved upwardly with respect to the road surface. When wheel 97 drops into a hole or a depression, bracket 99 will be pivotally moved forwardly which causes rod 127 to pull bracket 119 forwardly thereby causing frame 71 to be lowered with respect to wheel 117 thereby causing the weight of the frame and the load carried thereon to be equally distributed between the front and rear wheels. When wheel 117 drops into a hole or depression, bracket 119 will be pivotally moved rearwardly thereby causing rod 127 to pull bracket 99 rearwardly thereby causing frame 71 to be lowered with rsepect to wheel 97 which causes the weight of the frame and the load carried thereon to be substantially evenly distributed between the front and rear wheels.

With respect to the embodiment of FIGS. 9-11, the normal method of operation is as follows. Air bags 161, 161' and 161" will normally be expanded during the operation of the vehicle. Air under pressure will be supplied through intake connection 175 to the system thereby causing the ground engaging wheels to occupy the position seen in FIG. 9. FIG. 10 illustrates the reaction when one of the ground engaging wheels strikes an obstruction. When wheel 155 strikes an obstruction in the road surface, wheel 155 is pivotally moved upwardly with respect to side 139 thereby causing the upper end of arm member 149 to be moved forwardly causing the compression of air bag 161. The compression of air bag 161 causes the air therein to be forced therefrom into air bags 161' and 161" thereby causing the expansion of the same. The expansion of air bags 161' and 161" causes the upper ends of arm members 147' and 147" to be slightly pivotally moved rearwardly with respect to side 139 which causes wheels 155' and 155" to exert a greater pressure on the road surface thereby causing the weight of the frame and the load carried thereon to be more evenly distributed between the various wheels. In conventional vehicles, the engagement of the forward wheel with an obstruction would cause all of the weight at one side thereof to be transferred to the forward wheel which would cause a serious weight problem to be created thereon. In this invention, the engagement of one of the wheels with an obstruction causes the weight of the frame and the load carried thereon to be transferred to the other wheels of the assembly thereby causing a more equal distribution of the weight. When either of the wheels 155, 155' or 155" drop into a hole or a depression in the road surface, the air bag associated therewith will expand thereby drawing air thereinto from the other air bags in the system which causes the wheel engaging the hole to carry its portion of the load without exerting additional pressure on the remaining wheels in the system.

In some cases it may be desirable to disengage the forward wheel from the road surface. When it is so desired, valve 177 is closed and valve 171 is opened thereby causing the interior bag 161 to be in communication with the atmosphere. Wheel 155 may then be easily raised to the position seen in FIG. 11 and toggle 191 secured thereto to maintain it in this position. The remaining wheels in the system will function as previously described even though wheel 155 is not being actively employed.

Frequently, a load will be unevenly placed on frame 133 so that either side 139 or 141 will be higher than the other. The frame 133 may be easily leveled by the utilization of the invention seen in FIGS. 9–11. The side of the frame that is the lower of the two sides may be raised by simply causing an additional amount of air to be supplied to air bags 161, 161' and 161" thereby effectively raising the lower side of the frame with respect to the higher side of the frame. Conversely, the side of the frame that is the higher of the two sides may be lowered by simply draining a portion of the air from bags 161, 161' and 161" by means of valve 171. The draining of the air from the air bags at the highest side of the frame would cause the upper ends of arm members 147, 147' and 147" to be pivotally moved forwardly which would cause frame 133 to be lowered with respect to the ground surface.

With respect to the embodiments seen in FIGS. 12 and 13, the normal method of operation is as follows. The forward ends of conventional vehicles and trailers have a tendency to lurch forwardly and downwardly when the brakes of the vehicle or trailer are applied. The device seen in FIGS. 12 and 13 is intended to eliminate this objectionable lurching effect. When the vehicle is operating and the brakes have not been applied, the air in the system will pass from the lower end of valve 221. When brake pedal 225 is depressed, the air in the system will be supplied to brakes 223 and will also be supplied to air bag 215 which is operatively connected to the wheel means 205. The air system causes air bag 215 to be expanded which counteracts the lurching effect of the trailer or vehicle. The expanded air bag 215 prevents wheel means 205 from pivoting with respect to frame 195 thereby causing the frame to remain level during the braking operation. As soon as the brake pedal 225 has been released, the air in bag 215 will drain from the system by means of the bottom side of valve 221.

Thus it can be seen from the foregoing that an extremely efficient means has been provided for evenly distributing the weight of a vehicle between the various wheels thereof. Thus it also can be seen that a unique means has been described for leveling a frame having an uneven distribution thereon. Thus, from the foregoing it can be seen that the device accomplishes at least all of its stated objectives.

Some changes may be made in the construction and arrangement of my oscillating wheel support for vehicles without departing from the real spirit and purpose of my invention, and it is my intention to cover by my claims, any modified forms of structure or use of mechanical equivalents which may be reasonably included within their scope.

I claim:
1. In combination,
a vehicle frame having lateral sides,
at least a pair of wheel assemblies independently rotatably and pivotally secured to each side of said frame,
each of said wheel assemblies including an axle member pivotally secured to said frame and having inner and outer ends, an arm member secured to the outer end of said axle member and extending transversely therefrom and having opposite ends, a spindle member secured to one end of said arm member and extending transversely therefrom in a parallel relationship to said axle, and a wheel rotatably mounted on said spindle member,
the arm members of each of said wheel assemblies of said pair of wheels normally extending towards each other,
a bracket secured to each of said arm members intermediate the length thereof and extending upwardly therefrom,
and a rod extending between the brackets of each pair of wheel assemblies, wherein each of said brackets limits the movement of said rod in one direction.
2. The combination of claim 1 wherein each of said brackets includes a vertically disposed slot formed therein through which said rod extends.

References Cited
UNITED STATES PATENTS

| 1,861,866 | 6/1932 | Knox | 280—104 |
| 2,877,023 | 3/1959 | Shaffer | 280—104.5 |
| 2,911,230 | 11/1959 | Peras | 280—104 |
| 3,097,862 | 7/1963 | Dye | 280—104 |

BENJAMIN HERSH, *Primary Examiner.*

PHILIP GOODMAN, *Examiner.*